Dec. 21, 1965  H. STINNES  3,224,860
GLASS FORMING MOLD
Filed May 21, 1962  2 Sheets-Sheet 1
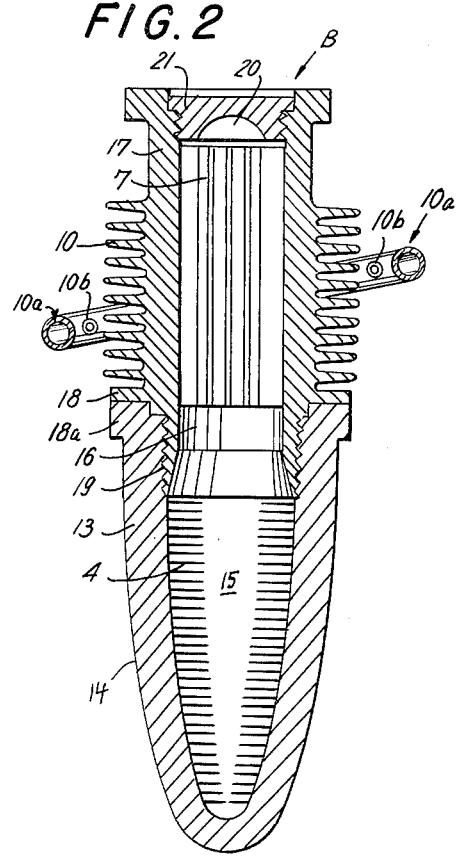
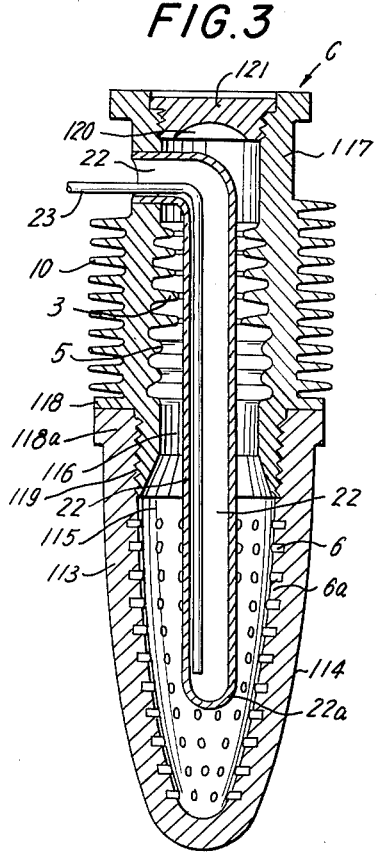
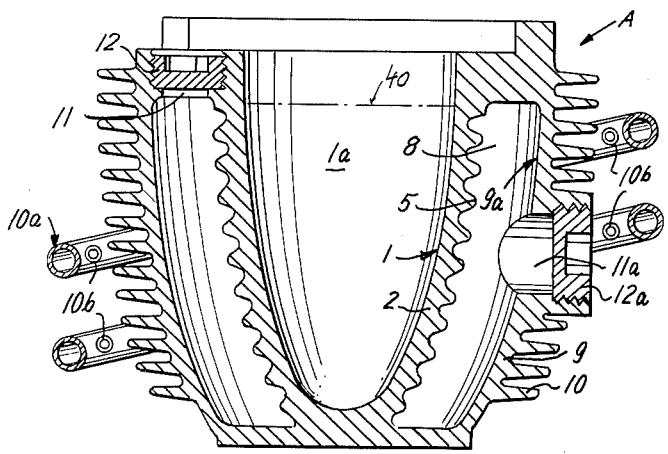
INVENTOR:
HANNS STINNES
BY
Michael S. Striker
his ATTORNEY Dec. 21, 1965  H. STINNES  3,224,860
GLASS FORMING MOLD
Filed May 21, 1962  2 Sheets-Sheet 2

INVENTOR:
HANNS STINNES
BY
Michael J. Striker
his ATTORNEY 3,224,860
GLASS FORMING MOLD
Hanns Stinnes, Marien Strasse 18–20 Dorsten 2,
Westphalia, Germany
Filed May 21, 1962, Ser. No. 196,112
Claims priority, application Germany, May 27, 1961,
St 17,878
10 Claims. (Cl. 65—355)

The present invention relates to glass forming molds in general, and more particular to improvements in means for and in methods of dissipating heat which glass forming molds receive from molten vitreous material.

Heretofore, glass forming molds were usually cooled by air, water or steam. Such cooling methods are not entirely satisfactory because it is not always possible to dissipate heat at the same rate at which the mold takes up heat from molten vitreous material. In other words, conventional molding operations must be carried out in a way to take into full consideration the fact that at least some residual heat will remain in the mold and that the mold will be unable to dissipate heat at the same rate at which it is being heated by molten vitreous material.

Accordingly, it is an important object of the present invention to provide a method of dissipating heat which a glass forming mold receives from molten vitreous material according to which the dissipation of heat can occur at a rate faster than the rate at which the mold takes up heat from molten vitreous material.

Another object of the invention is to provide a method of the just outlined characteristics acording to which the dissipation of heat may be regulated in a very simple and efficient manner so that the mold may dissipate larger or smaller quantities of heat per unit of time.

A further object of the instant invention is to provide a method of cooling a glass forming mold and of dissipating heat which the mold takes up from molten vitreous material according to which the flow of heat from molten vitreous material to the point or points where it may be radiated into the atmosphere is always unidirectional so that undesirable accumulations of heat in the mold are prevented at all times.

A concomitant object of the invention is to provide an improved glass forming mold for the practice of the above outlined method.

Still another object of the invention is to provide a mold which is capable of withdrawing heat from molten vitreous material at a rate at least equal to the rate at which the mold receives heat from molten material.

A concomitant object of the invention is to provide a mold of the above outlined characteristics which is constructed and assembled in such a way that it may accommodate one or more special heat conducting substances which not only conduct heat but simultaneously cool the mold even though they need not always be cooled by special cooling devices.

With the above objects in view, the invention resides in the provision of a method of dissipating heat transmitted by molten vitreous material to a glass forming mold having a first surface portion contacted by and a second surface portion out of contact with molten vitreous material. The method comprises the steps of unidirectionally conveying heat from the first surface portion to the second surface portion of the mold and of causing heat to radiate from the second surface portion.

In accordance with an important feature of my method, a substance which is a good conductor of heat and which is in liquid state at temperatures (about 500° C.) prevailing in a glass forming mold is introduced between the two surface portions of the mold so that the heat passes through this substance on its way to that surface portion from which it can be dissipated by radiation into the atmosphere. The heat conducting substance preferably consists of lead, tin, lead or tin alloys, an alkali metal, an alkali metal salt, an alkali metal hydride or an alkali metal hydroxide. Very good results were achieved with lead, tin, sodium, potassium, sodium hydroxide, potassium hydroxide and sodium bichromate.

The improved glass forming mold may assume the shape of a male or female mold and is formed with at least one internal chamber for reception of a heat conducting substance so that heat transmitted by molten vitreous material to the internal surface (female mold) or to the etxernal surface (male mold) of the glass forming mold is caused to pass through the heat conducting surface before it can reach that surface or surface portion of the mold which is exposed to the atmosphere.

In accordance with another feature of my invention, a special receptacle is provided for filling the internal chamber or chambers of the mold with an oxidizable heat conducting substance (e.g. sodium) in such a way that the heat conducting substance cannot react with atmospheric air.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 1 is an axial section through a female glass forming mold which defines a mold cavitly for molten vitreous material and which embodies one form of my invention;

FIG. 2 is an axial section through a male glass forming mold which comprises a lower section or ram adapted to be immersed into molten vitreous material and an upper section or neck which is detachably secured to the lower section and which serves as a means for dissipating heat transmitted to it by the lower section;

FIG. 3 is an axial section through a male glass forming mold which is similar to the mold of FIG. 2 with the exception that it comprises an additional cooling arrangement which is adapted to recirculate a cooling fluid in the interior of a heat conducting substance that fills the mold sections;

Figure 4:
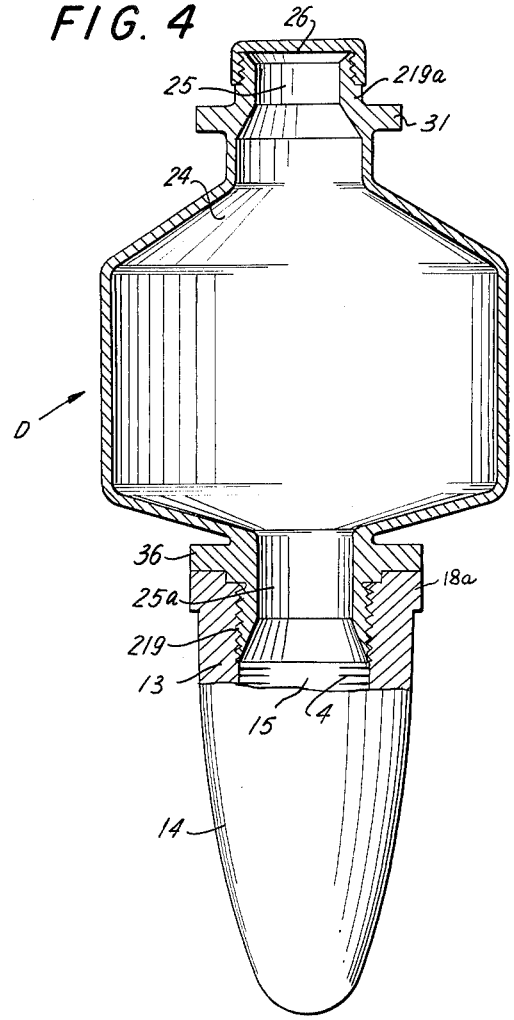
Figure 5:
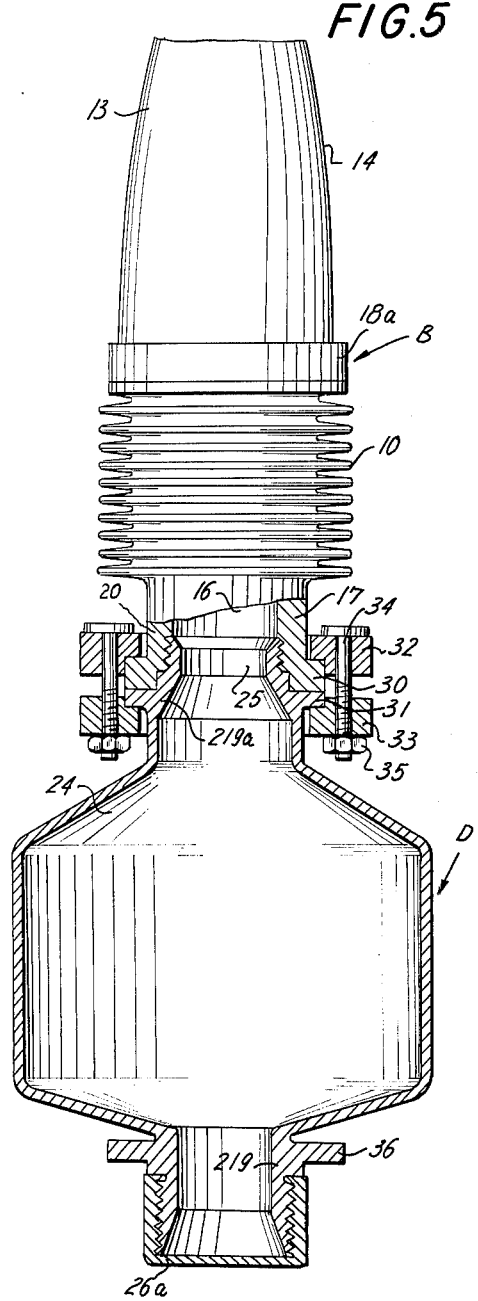
Figure 6:
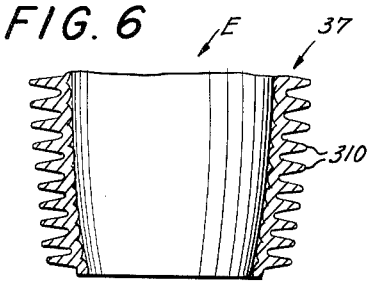

FIG. 4 is a partly elevational and partly sectional view of the lower mold section shown in FIG. 2 and of a receptacle which serves as a means for admitting sodium or another readily oxidizable heat conducting substance to the internal chamber of the lower mold section and which is shown in a position it assumes at the time the heat conducting substance is being transferred into the internal chamber of the lower mold section;

FIG. 5 illustrates the structure of FIG. 4 in inverted position which the receptacle and the lower mold section assume when the heat conducting substance is being returned into the receptacle; and FIG. 6 is a fragmentary elevational view of a female glass forming mold which is detachably received in a flexible tube provided with external heat dissipating ribs.

Referring now in greater detail to the illustrated embodiments, and first to FIG. 1, there is shown a female glass forming mold A which consists of suitable heat-resistant metallic material and which defines a mold cavity 1a bounded by a smooth internal surface 1 and adapted to receive a molten substance, e.g. molten glass, so that the molten substance fills the mold cavity to a level indicated by the phantom line 40 and that it transmits its heat to the inner wall 2 which surrounds the mold cavity. The outer side of the inner wall 2 is provided with heat dissipating projections here shown as circumferential corrugations or undulations 5 which enlarge the external surface of the inner wall and which transmit heat to a heat conducting substance at least partially filling an annular chamber 8 and which remains stagnant in this chamber at least during such heat transmission. The mold A further comprises an outer wall or mantle 9 whose smooth internal surface 9a surrounds the chamber 8 and whose outer side is provided with heat dissipating projections in the form of comparatively long circumferentially extending ribs 10. The provision of ribs 10 is an optional feature of the improved mold, and these ribs may be cooled by blasts of cooling air or another suitable fluid which is discharged by nozzles 10b provided on a helically convoluted header 10a disposed about the mantle 9. It will be readily understood that the nozzles 10b may discharge a cooling fluid other than air, and that the rate of coolant discharge through the nozzles 10b may be varied to thereby regulate the dissipation of heat on the external surface of the mantle 9.

The mantle 9 is provided with an outlet 11a for discharge of heat conducting substance from the chamber 8, and this outlet may be sealed by a bung 12a or another readily removable closure device.

At the upper end of the mold A, there is provided an inlet 11 which is sealable by a second closure device in the form of a bung 12.

It will be noted that the mold A is constructed to withdraw heat in a direction from the internal surface 1 which bounds the mold cavity 1a toward the external surface of the mantle 9, namely, from a surface of smaller area to a surface of larger area. The area of the external surface of the mantle 9 is greatly enlarged by the provision of aforementioned ribs 10 whose dimensions are selected with a view to insure that heat withdrawn from the molten vitreous substance contained in the mold cavity 1a is dissipated at a requisite rate of speed. The cooling effect may be varied by regulating the rate at which blasts of cooling fluid are discharged through the nozzles 10b. In fact, the rate at which the mold A may dissipate heat can be regulated in a number of ways, namely, by proper selection of surface-enlarging external projections 5 on the inner wall 2, by suitable selection of the heat conducting substance which fills the chamber 8, by suitable selection of the volume of this chamber, by proper selection of projections 10 on the exterior of the mantle 9, and by regulating the rate of coolant discharge through the nozzles 10b.

FIG. 2 illustrates a modified glass forming mold B which constitutes a male mold or ram and which includes a lower section or mold element 13 and an upper section or neck 17. The withdrawal of heat takes place from the external surface 14 to the internal surface of the mold section 13 and from the internal surface to the external surface of the mold section 17. When the composite mold B is put to actual use, the section 13 is immersed into a gob of molten glass and the molten material transmits its heat to the surface 14 so that heat is thereupon conducted to the smaller-area inner side of the section 13. This inner side is provided with surface-enlarging internal projections in the form of fins 4 which surround a chamber 15 for a heat conducting substance of the type to be described later. It is preferred to form the inner side of the mold wall with a sufficient number of projections to insure that the total area of the internal surface at least equals the area of the surface 14 whereby the internal surface can transmit all heat transmitted by molten material into which the lower section 13 is caused to dip.

The upper section 17 defines an internal chamber 16 which communicates with the chamber 15. The means for detachably coupling the sections 13, 17 comprises an internally threaded collar 18a at the open upper end of the section 13 and a nipple in the form of an externally threaded sleeve 19 which is provided at the open lower end of the section 17. The sleeve 19 is screwed into the collar 18a and is provided with an internal annular flange 18 which comes into sealing abutment with the upper end face of the section 13 when the two sections are properly assembled. The internal surface of the section 17 is provided with heat dissipating projections in the form of substantially axially parallel ribs 7. The outer side of the section 17 is provided with heat dissipating projections in the form of ribs 10 similar to the ribs on the mantle 9. The ribs 10 of the section 17 may be cooled by blasts of cooling air or another fluid discharged by the nozzles 10b of a coil or header 10a in the same way as described in connection with FIG. 1.

The upper end of the section 17 is formed with an inlet 20 which is sealable by a closure device in the form of an externally threaded bung 21 and which serves as a means for permitting introduction or evacuation of a heat conducting substance from the chambers 15 and 16.

It will be noted that the withdrawal of heat from molten material surrounding the surface 14 takes place substantially radially inwardly through the lower section 13, then upwardly through the heat conducting substance in the chambers 15 and 16, and finally radially outwardly through the upper section 17. The rate at which heat is being withdrawn may be regulated by varying the cooling action of the fluid discharged through the nozzles 10b, by increasing or reducing the number of the radial length of the ribs 10, by changing the configuration and/or the number of projections 7 at the inner side of the section 17, and/or by changing the configuration and/or the number of projections 4 at the inner side of the section 13. Of course, the external surface 14 need not always be smooth, since its configuration will depend on the configuration of the depression which the lower section 13 should form in the vitreous material.

It will be readily understood that the chambers 15 and 16 may be filled with a heat conducting substance before the nipple 19 is screwed into the collar 18a so that the section 17 need not always be provided with an inlet. This is especially desirable in the event that the heat conducting substance is solid at normal temperatures and is liquefied only at elevated temperatures to which it is subjected when the lower section 13 dips into molten vitreous material.

FIG. 3 shows a glass forming mold C which is similar to the mold B with the exception that the inner side of the lower section 113 is provided with heat dissipating projection 6a formed by blind holes 6. The external surface 114 of the lower section 113 is similar to the external surface 14, and the coupling means 118, 118a, 119 is analogous to the coupling means of FIG. 2. The internal chamber 116 of the upper section or neck 117 communicates with the internal chamber 115 of the lower section 113. The inlet 120 of the upper section 117 is sealable by a bung 121. It will be noted that the inner side of the section 117 is provided with a first group of heat dissipating projections in the form of annular ribs 3 and with a second group of projections which assume the form of annular corrugations 5. Other combinations of projections 3, 4, 5, 6a, 7 and/or 10 are possible.

The mold C further comprises means for intermittently or continuously cooling the heat conducting substance which fills the chambers 115 and 116. This cooling means comprises a pipe 22 which extends through the wall of the section 117, through the chamber 116 and into the chamber 115. The lower end 22a of this pipe is sealed, and it will be noted that the pipe 22 extends to the bottom zone of the chamber 115. A smaller diameter conduit 23 is accommodated in the pipe 22, and the open discharge end of this conduit extends close to the end 22a. The conduit 23 serves as a means for continuously or intermittently admitting a gaseous or liquid coolant into the pipe 22 so that the coolant enters the pipe at a point close to the lower end 22a thereof and thereupon rises to be evacuated through the open upper end of this pipe. Thus, the flow of coolant in the pipe 22 and conduit 23 takes place countercurrently, i.e. downwardly through the conduit and upwardly through the pipe. In this manner, the pipe 22 may withdraw substantial quantities of heat from the substance that fills the chambers 115 and 116, thus enabling the substance to continuously transmit large quantities of heat from molten vitreous material which surrounds the external surface 114 of the lower section 113. The outer side of the section 117 is provided with heat dissipating circumferentially extending ribs 10.

It will be readily understood that the intake end of the conduit 23 is connectable to a suitable pump or compressor which causes the coolant to rise in the pipe 22, or that the discharge end of the pipe 22 may be connected to a suction generating device that draws a coolant through the conduit 23. In addition to the cooling means 22, 23, the mold C of FIG. 3 may be provided with external cooling means such as the coil 10a and the nozzles 10b of FIG. 1 or 2.

Referring to FIG. 4, there is shown the lower section 13 of the mold B and a special storing means including receptacle D which is capable of transferring a measured amount (by weight) of a liquefiable heat conducting substance from its internal compartment 24 into the internal chamber 15 or 16. The heat conducting substance is assumed to be sodium which is in solid state. Since sodium oxidizes instantly on exposure to air, the receptacle D must be provided with means for transferring its contents into the chamber 15 without exposing the contents to atmospheric air. This is attained by providing one end of the receptacle with an externally threaded nipple 219 which defines an outlet 25a for the contents of the compartment 24. Of course, before being transferred into the chamber 15, sodium contained in the compartment 24 is heated to a temperature above 97.5° C. so that it melts and that ia can readily flow into the lower section 13. The nipple 219 is screwed into the collar 18a and is provided with an annular flange 218 which sealingly abuts against the upper end face of the section 13.

When the substance filling the chamber 15 hardens, the receptacle D is separated from the lower section 13 and the latter is then coupled with the upper section 17 in a manner as shown in FIG. 2 or 5. The mold B is now ready for use.

Before being coupled to the section 13, the upper section 17 is filled with sodium by utilizing the receptacle D in a slightly different manner. As shown in FIG. 4, the other (upper) end of the receptacle is provided with a second externally threaded nipple 219a which defines an outlet and which is sealable by a cap 26. When the cap 26 is removed, the nipple 219a may be screwed into the outlet 20 of the section 17 in a manner shown in FIG. 5, whereupon the passage 25 in the nipple 219a admits a metered quantity of molten sodium into the internal chamber 16.

In fact, if the capacity of the receptacle D is sufficient to accommodate such quantities of sodium as are necessary to simultaneously fill the chamber 15 and the chamber 16, the sections 13, 17 may be filled in a single operation. In the first step, the sleeve 19 of the section 17 is screwed into the collar 18a of the section 13, and the bung 21 is removed. The cap 26 is removed and the nipple 219a of the receptacle D is screwed into the outlet 20. The nipple 219 is then sealed by a second cap 26a which is shown in FIG. 5. In the next step, the contents of the compartment 24 are melted by heating so that the heat conducting substance flows by gravity into the chambers 15 and 16 when the receptacle D is located at a level above the mold B. In the final step, the nipple 219 is separated from the section 17 and the outlet 20 is sealed by the bung 21.

FIG. 5 illustrates the manner in which the contents of the chambers 15 and 16 may be reintroduced into the internal compartment 24 of the receptacle D. The nipple 219 is screwed into the outlet 20 while the cap 26a seals the other nipple 219a. If the substance filling the chambers 15 and 16 of the mold B is in molten state or is heated to a temperature above 97.5° C., it returns automatically into the compartment 24 as soon as the mold B is moved to a level above the receptacle D. It will be noted that, for insuring that air cannot penetrate into the assembly of FIG. 5, the external collar 30 at the open end of the section 17 and the external collar 31 of the nipple 219a may be clamped together by a pair of suitably configurated rings 32, 33 which are provided with registering apertures for a series of bolts and nut 34, 35. The other nipple 219 is provided with an external collar 36 which may be clamped to the collar 18a of the lower section 13 by utilizing the clamping means 32–35 of FIG. 5 when it is desired to transfer sodium from the compartment 24 into the chamber 15 or vice versa.

The receptacle D serves as a storage tank for sodium when the mold B is not in use.

FIG. 6 shows a further modification of my invention according to which the outer side of a female mold E (similar to the mold A of FIG. 1) is detachably received in a flexible elastic tube 37 serving as a substitute for the projections 10. Such flexible tubular means are readily available on the market. The advantage of the tube 37 is that it may be separated from the mold E to be replaced by a differently configurated tube when it becomes necessary to change the heat dissipating characteristics of the mold. For example, each mold may be furnished with a set of elastically deformable tubes 37 whose outer sides are provided with differently distributed and/or dimensioned projections or ribs 310. The tube 37 may be replaced by a corrugated tube which is provided with hollow ribs. A similar tube may be utilized on the upper section 17 or 117 of FIG. 2 or 3.

It will be readily understood that the molds A–C and E may be provided with differently configurated and/or distributed projections. For example, the external ribs 10 of the mold A may be replaced by corrugations 5 or by fins 4, the corrugations 5 of FIG. 1 may be replaced by projections 6a and/or axially parallel ribs 7, the mold section 13 of FIG. 2 may be provided with two or more groups of differently configurated heat dissipating projections, and so on. The configuration, distribution and nature of projections depend on the extent to which the respective mold should dissipate heat.

A very important advantage of glass forming molds which utilize sodium or an equivalent heat conducting substance is that the cooling effect may be improved because the high specific heat of sodium contributes to direct cooling of the mold. As is known, sodium is a good conductor of heat and its specific heat is very high. Since the mold can be formed with one or more comparatively large chambers for reception of a heat conducting substance, the quantity of sodium may be selected in such a way that, owing to its high specific heat, sodium may absorb substantial quantities of heat to make sure that the mold can be cooled without utilizing special cooling devices, i.e. even the cooling means 10a, 10b and/or 22, 23 may be dispensed with. In other words, the quantity of heat not taken up by the heat conducting substance filling say the chamber 8 of the mold A shown in FIG. 1 is so small that such excess heat can be dissipated by simple radiation without necessitating the provision of cooling means 10a, 10b. Consequently, the flow of heat from the internal surface 14 to the surfaces of the ribs 10 is unidirectional and the cooling of molten material contained in the mold cavity 1a may be achieved without artificial cooling of the mold. It will be readily understood that such operation is much cheaper, simpler and more suited for mass manufacture of shaped vitreous articles than the conventional methods of which I am aware at this time.

In order that the mold may accommodate large quantities of a heat conducting substance, its wall or walls are made as thin as permissible, namely, the wall thickness should be selected in a way to insure that the mold is capable of retaining its shape when it comes into contact with molten material.

In the glass molding operation, one must take into consideration that the average temperature to which the mold is subjected is in the neighborhood of 500° C. Therefore, the heat conducting substances which are suited for use in the mold of my invention must have a melting point which is preferably well below and a boiling point which is preferably well above 500° C. The desirability of utilizing a heat conducting substance which is liquid at 500° C. will be readily understood if one considers that a liquid is not subjected to internal stresses in response to changes in temperature so that the liquid substance nearly filling say the chamber 8 of the mold A will not subject the walls 2 and 9 to any stresses as long as the volume of the chamber 8 is sufficiently large. On the other hand, it is equally desirable that the boiling point of heat conducting substances which are being used in the mold of my invention should be well above 500° C. to make sure that the heat conducting substance does not develop vapors which could raise the pressure in the internal chamber or chambers of the mold.

The heat conducting substances which I prefer to utilize in my improved mold include lead, tin, cadmium, caesium, indium, lithium, rubidium, selenium, tellurium, thallium, bismuth and the remaining alkali metals particularly sodium and potassium. Highly satisfactory results were obtained by utilizing alloys of lead or tin with cadmium, caesium, indium, lithium, rubidium, selenium, tellurium, thallium and bismuth as well as certain other lead and tin alloys. Good results were achieved with alkali metal salts, hydrides and hydroxides, particularly potassium hydroxide (KOH), sodium hydroxide (NaOH) and sodium bichromate ($Na_2Cr_2O_7$).

Of the abovementioned substances, caesium has the lowest melting point (28.45° C.) and tin has the highest boiling point (2260° C.).

The heavy metals lead and tin or their alloys may be utilized whenever the overall weight of the mold is of lesser importance. In other instances, i.e. when the weight of the mold should be reduced to a minimum, sodium, potassium, their salts, hydrides or hydroxides and certain other alkali metals are preferred. Sodium in particular has been found to constitute a highly satisfactory heat conducting substance and, save for the precautions ncessary during its introduction into or evacuation from the chamber or chambers of the mold, this substance is one of the most preferred materials of which I am aware at this time. Since the heat conducting substance is always sealed in the interior of the mold when the latter is in actual use, it is not necessary to refill the mold between successive molding operations. The heat conducting substance sodium also serves as a heat accumulator without coming in actual contact with molten material, and its very important advantage resides in that it enables the mold to dissipate as much heat as it receives from molten material so that the flow of heat is always unidirectional, that is, from the melt-contacting surface to the non-immersed surface of the mold. In other words, my method of withdrawing heat from molten material is a true unidirectional method.

Molds of the type shown in FIGS. 1 to 6 can be used in all or nearly all machines for the manufacture of vitreous products including semi- and fully automatic machines. For example, the molds of my invention may be put to use in Hartford, Lynch, I. S. Roirant, Poeting and other types of machines. Of course, such molds are equally useful in so-called hand blowing of glass.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A mold for shaping and for withdrawing heat from molten vitreous material, comprising wall means having a first surface portion which is adapted to be placed in heat receiving contact with molten vitreous material and a heat radiating second surface portion which is exposed to coolant when the first surface portion is in contact with molten vitreous material, one of said surface portions substantially surrounding the other said mold defining at least one sealable internal chamber intermediate said surface portions; and a substance with good heat conducting characteristics substantially filling and fully enclosed in said chamber, said substance having a melting point below and a boiling point above 500° C. so that said substance is liquid at temperatures to which the mold is subjected when said first surface portion is in contact with molten vitreous material and conducting heat from said first surface to said second surface when molten vitreous material is in contact with said first surface.

2. A mold as set forth in claim 1, wherein said substance is selected from the group consisting of lead, tin, lead alloys, tin alloys, and alkali metals.

3. A mold for shaping and for withdrawing heat from molten vitreous material, comprising wall means having a first surface portion which is adapted to be placed in heat receiving contact with molten vitreous material and a heat radiating second surface portion which is exposed to coolant when the first surface portion is in contact with molten vitreous material, one of said surface portions substantially surrounding the other said mold defining at least one sealable internal chamber intermediate said surface portions; a substance with good heat conducting characteristics substantially filling and being fully enclosed in said chamber, said substance having a melting point below and a boiling point above 500° C. so that said substance is liquid at temperatures to which the mold is subjected when said first surface portion is in contact with molten vitreous material; and means extending into said chamber for cooling said substance and conducting heat from said first surface to said second surface when molten vitreous material is in contact with said first surface.

4. A mold for shaping and for withdrawing heat from molten vitreous material, comprising wall means having a first surface portion which is adapted to be placed in heat receiving contact with molten vitreous material and a heat radiating second surface portion which is exposed to air when the first surface portion is in contact with molten vitreous material, one of said surface portions substantially surrounding the other said mold defining at least one sealable internal chamber intermediate said surface portions; a substance with good heat conducting characteristics substantially filling and being fully enclosed in said chamber, said substance having a melting point below and a boiling point above 500° C. so that said substance is liquid at temperatures to which the mold is subjected when said first surface portion is in contact with molten vitreous material and conducting heat from said first surface to said second surface when molten vitreous material is in contact with said first surface; and means adjacent to said second surface portions for cooling the mold.

5. A female mold for shaping and for withdrawing heat from molten vitreous material, comprising an inner wall defining a mold cavity and having an outer side and an internal surface, said internal surface bounding said mold cavity and in heat receiving contact with molten vitreous material when such material is introduced into the mold cavity; an outer wall surrounding said inner wall and having an internal surface and a heat radiating outer side, the internal surface of said outer wall and the outer side of said inner wall defining between themselves an internal chamber and said mold having sealable inlet means communicating with said chamber; a substance with good heat conducting characteristics substantially filling and being fully enclosed in said chamber, said substance having a melting point below and a boiling point above 500° C. so that said substance is liquid at temperatures to which the mold is subjected when the internal surface of said inner wall is in contact with molten vitreous material and conducting heat from said inner wall to said outer wall when molten vitreous material is introduced into said mold cavity; and heat dissipating projections provided at the outer side of said inner wall.

6. A female mold for shaping and for withdrawing heat from molten vitreous material, comprising an inner wall defining a mold cavity and having an outer side and an internal surface, said internal surface bounding said mold cavity and in heat receiving contact with molten vitreous material when such material is introduced into the mold cavity; an outer wall surrounding said inner wall and having an internal surface and a heat radiating outer side, the internal surface of said outer wall and the outer side of said inner wall defining between themselves an internal chamber and said mold having sealable inlet means communicating with said chamber; a substance with good heat conducting characteristics substantially filling and being fully enclosed in said chamber, said substance having a melting point below and a boiling point above 500° C. so that said substance is liquid at temperatures to which the mold is subjected when the internal surface of said inner wall is in contact with molten vitreous material and conducting heat from said inner wall to said outer wall when molten vitreous material is introduced into said mold cavity; and heat dissipating projections provided at the outer sides of said inner and outer walls.

7. A female mold for shaping and for withdrawing heat from molten vitreous material, comprising an inner wall defining a mold cavity and having an outer side and an internal surface, said internal surface bounding said mold cavity and in heat receiving contact with molten vitreous material when such material is introduced into the mold cavity; an outer wall surrounding said inner wall and having an internal surface and a heat radiating outer side, the internal surface of said outer wall and the outer side of said inner wall defining between themselves an internal chamber and said mold having sealable inlet means communicating with said chamber; a substance with good heat conducting characteristics substantially filling and being fully enclosed in said chamber, said substance having a melting point below and a boiling point above 500° C. so that said substance is liquid at temperatures to which the mold is subjected when the internal surface of said inner wall is in contact with molten vitreous material and conducting heat from said inner wall to said outer wall when molten vitreous material is introduced into said mold cavity; heat dissipating projections provided at the outer side of said inner wall; and detachable tubular means disposed about the outer side of said outer wall, said tubular means having an outer side provided with heat dissipating projections.

8. A female mold for shaping and for withdrawing heat from molten vitreous material, comprising an inner wall defining a mold cavity and having an outer side and an internal surface, said internal surface bounding said mold cavity and in heat receiving contact with molten vitreous material when such material is introduced into the mold cavity; an outer wall surrounding said inner wall and having an internal surface and a heat radiating outer side, the internal surface of said outer wall and the outer side of said inner wall defining between themselves an internal chamber and said mold having sealable inlet means communicating with said chamber; a substance with good heat conducting characteristics substantially filling and being fully enclosed in said chamber, said substance having a melting point below and a boiling point above 500° C. so that said substance is liquid at temperatures to which the mold is subjected when the internal surface of said inner wall is in contact with molten vitreous material and conducting heat from said inner wall to said outer wall when molten vitreous material is introduced into said mold cavity; heat dissipating projections provided at the outer sides of said inner and outer walls; and cooling means disposed about the outer side of said outer wall for directing a fluid coolant against the respective projections and for thereby cooling said mold.

9. A male mold for shaping and for withdrawing heat from molten vitreous material, comprising a first section defining an internal chamber and having an inner side bounding said chamber and an external surface, said external surface being in heat-receiving contact with molten vitreous material when said section is immersed in such material; a second section detachably connected with said first section and defining an internal chamber in communication with said first-mentioned chamber, said second section having an inner side bounding said last-mentioned chamber and a heat-radiating outer side; cooling means extending through said second section into the chamber of said first section; and a substance with good heat conducting characteristics substantially filling and being fully enclosed in said chambers between said inner sides and said cooling means, said substance having a melting point below and a boiling point above 500° C. so that said substance is liquid at temperatures to which the mold is subjected when said first section is immersed in molten vitreous material to conduct heat from said external surface to said cooling means when said first section is so immersed.

10. A mold as set forth in claim 9, wherein said cooling means comprises a pipe extending through said second section and having a sealed end portion received in the chamber of said first section, and coolant admitting conduit means received in said pipe and having an open discharge end adjacent to said sealed end portion.

References Cited by the Examiner
UNITED STATES PATENTS

| 1,633,028 | 6/1927 | LaFrance | 65—355 |
| 1,748,518 | 2/1930 | Midgley | 165—105 X |
| 2,096,250 | 10/1937 | Kasarjian | 165—105 X |
| 2,338,691 | 1/1944 | Tucker | 165—104 X |
| 2,564,427 | 8/1951 | DeRugeris | 222—146 X |
| 2,901,865 | 9/1959 | McCormick | 65—356 |
| 2,950,816 | 8/1960 | Arenz | 65—355 X |
| 2,988,851 | 6/1961 | Holscher | 65—374 X |

FOREIGN PATENTS

| 487,434 | 6/1938 | Great Britain. |
| 491,846 | 9/1938 | Great Britain. |

DONALL H. SYLVESTER, *Primary Examiner.*